March 30, 1965 J. VILLIERS 3,176,290
AERIAL NAVIGATION SYSTEM WITH BEACON IDENTIFICATION
Filed March 1, 1961 4 Sheets-Sheet 4
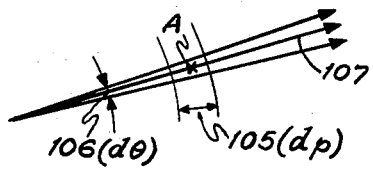
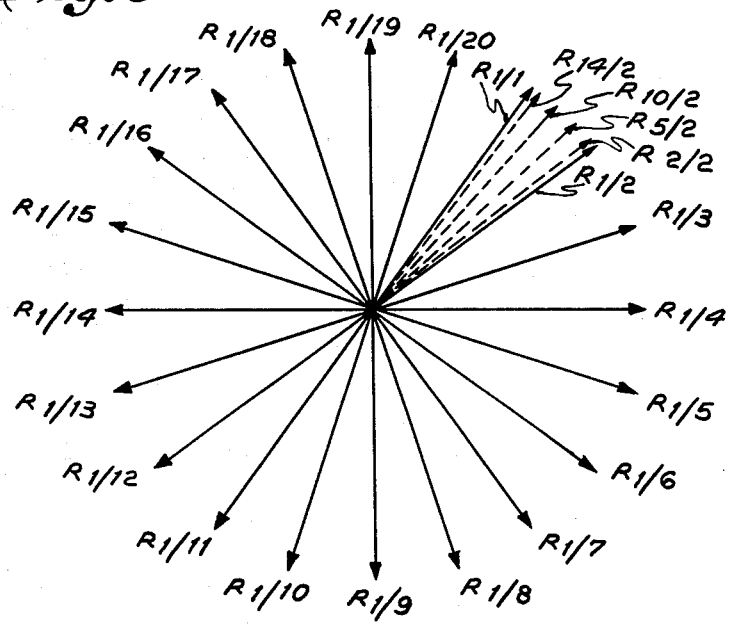
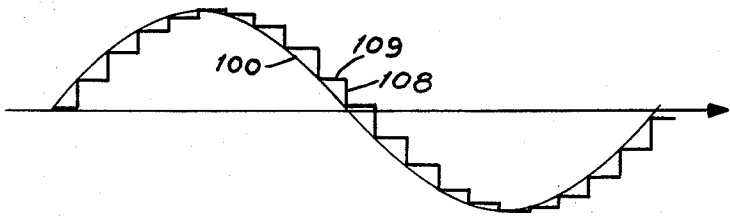
INVENTOR.
JACQUES VILLIERS
BY
ATTORNEY 3,176,290
AERIAL NAVIGATION SYSTEM WITH
BEACON IDENTIFICATION
Jacques Villiers, Paris, France, assignor to International
Standard Electric Corporation, New York, N.Y., a corporation of Delaware
Filed Mar. 1, 1961, Ser. No. 92,512
Claims priority, application France, Mar. 1, 1960, 820,011, Patent 1,226,485
4 Claims. (Cl. 343—6.5)

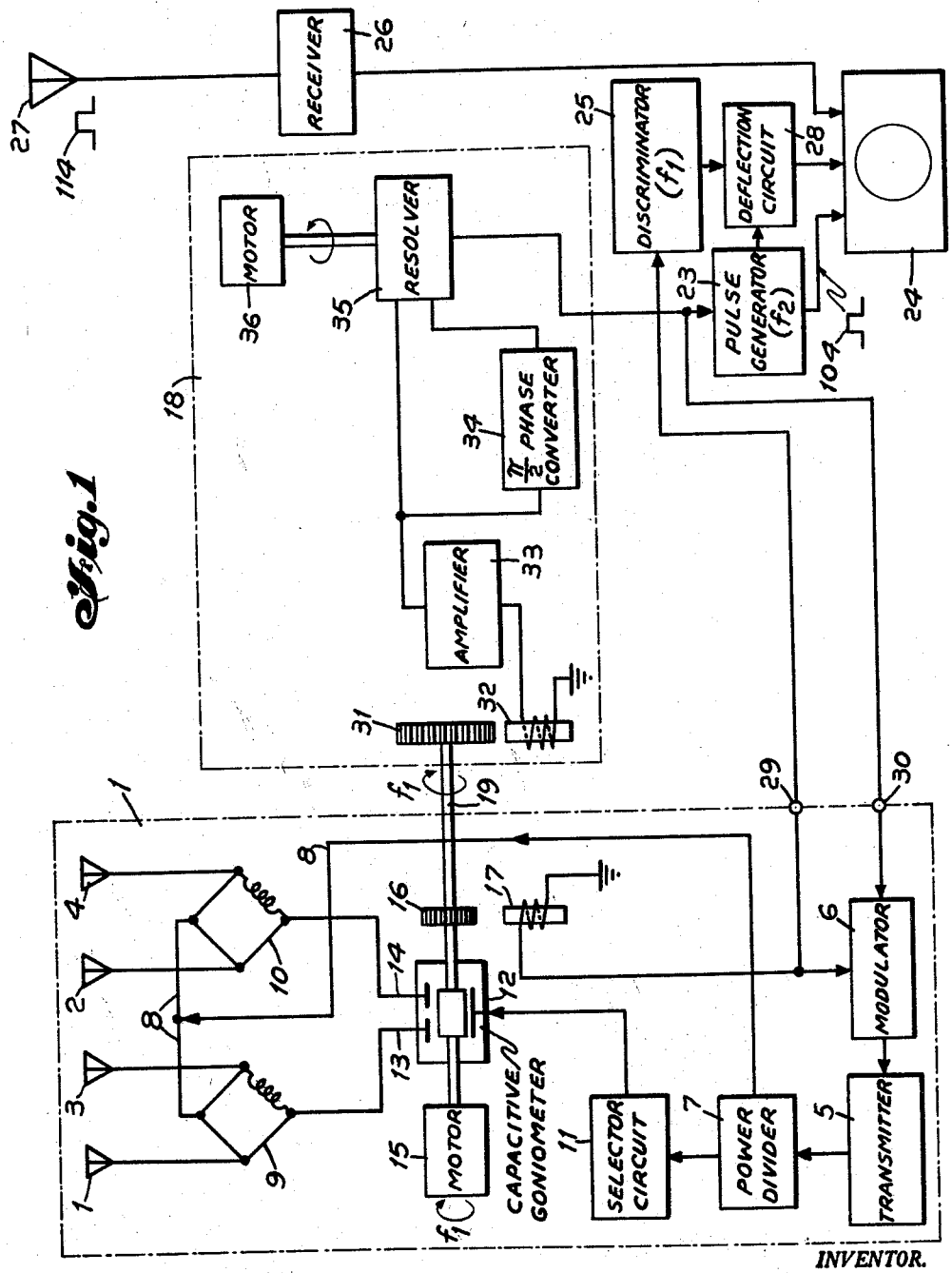

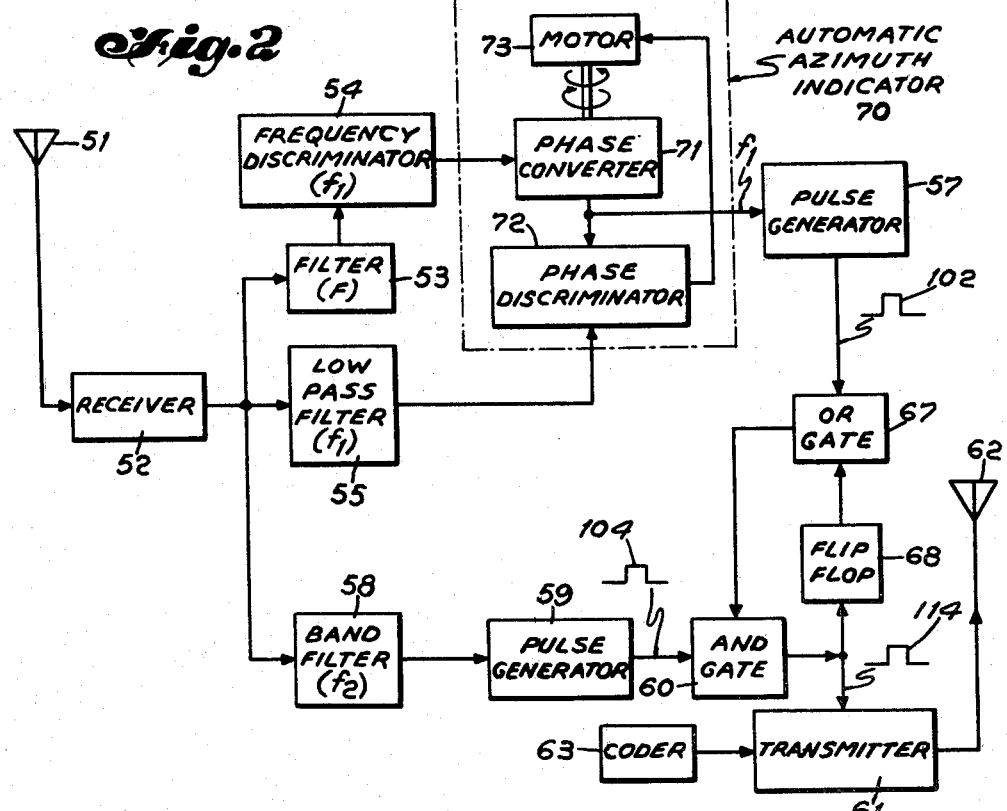
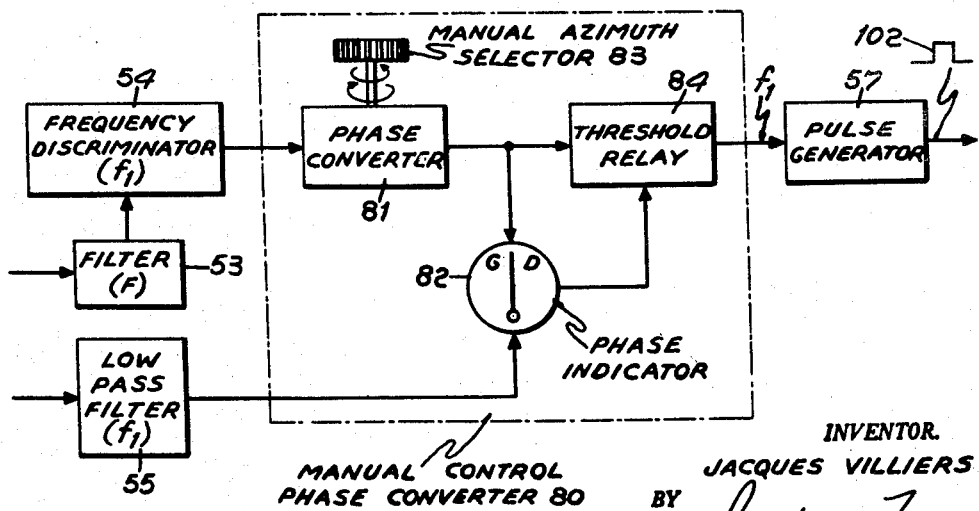

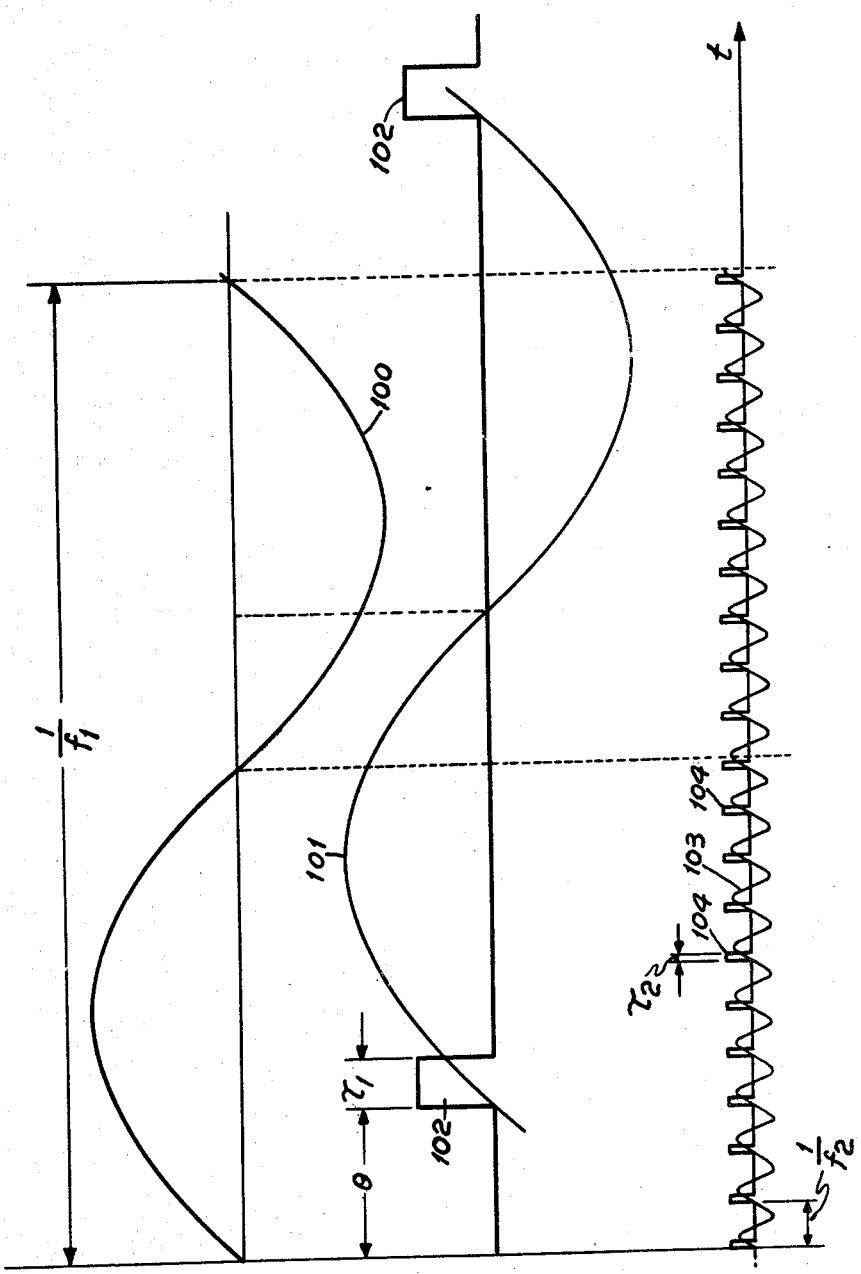

The present invention relates to improvements in a rotating radio-beacon system called VORDAR for locating mobile craft as described in my copending U.S. patent application filed January 18, 1960, Serial No 3,171 for "Rotating Radio Beacon System for Locating Objects."

More particularly, one of the objects of the present invention is to permit a ground VORDAR station to discriminate among responses transmitted by mobile stations on a sole air-ground frequency from those which are addressed to other stations in the vicinity. This discrimination is provided by means of a plurality of different frequencies in surrounding VORDAR stations for the additional modulation constituting their characteristic distance channel, and the transmission by mobile stations of two successive response pulses spaced by one period of the said modulation.

A second object of the present invention relates to improvements in the device generating the additional modulating frequency mentioned above to permit facility of modification with great accuracy.

A third object of the invention relates to a simplification of the mobile station equipment as described in the aforementioned patent application.

The invention will be best understood from the reading of the following description taken in conjunction with the accompanying drawings, in which:

FIGURE 1 illustrates the rotating radio-beacon in accordance with the present invention;

FIGURE 2 represents the receiving system on board the craft in accordance with the present invention;

FIGURE 3 represents an alternative embodiment of the receiving system in the mobile craft illustrated in FIG. 2; and FIGURE 4 is a signal diagram for explaining the locating system's operation;

FIGURES 5 and 6 are geometric diagrams for explaining the areolar character of the space scanning used in the locating system; and FIGURE 7 shows the shape of the scanning signals of the plan position cathode-ray tube.

FIGURE 1 represents a VORDAR rotating radio beacon modified according to the present invention. Frame I represents conventional VOR equipment identical to the one which is represented in dotted line frame I in FIGURE 1 of the aforementioned U.S. patent application. As known, such VOR equipment comprises means for radiating an omnidirectional wave modulated by a sub-carrier wave of frequency F which is itself modulated by a signal at the frequency $f_1$, and an azimuth measuring wave having a directional pattern rotating at the rate of $f_1$ rotations per second. Referring first to FIG. 1, a VOR of standard type, such as those currently used in civil aviation, is shown within the broken lines of box I. It comprises four antennas 1, 2, 3, 4, arranged at the corners of a square, the antennas 1 and 3 and the antennas 2 and 4 being diagonally opposite. These four antennas are supplied (1) in phase by a VHF carrier wave, modulated by a sub-carrier wave at frequency F, itself modulated by a signal at frequency $f_1$, and (2) with suitable respective phases by the same carrier wave, non-modulated. The sub-carrier F is dependent upon the number of teeth on tone wheel 16 and its speed of rotation. The teeth of the wheel 16 have variable spacing to generate in a coil a nominal frequency of F cycles modulated at the $f_1$ rate. The VHF power is produced by a transmitter 5, modulated by a modulator 6. The output of this transmitter is connected to a power divider 7 having two outputs. The first output is connected to power-supply line 8, which supplies the antennas in phase across balanced branches of bridges 9 and 10, by the reference wave doubly modulated at frequencies F and $f_1$. The second output is connected to a selector circuit 11 that serves to eliminate any modulation and to restore the pure carrier wave, then to a capacitive goniometer 12 outgoing from which are the supply lines 13 and 14 that supply the antennas 1–3 and 2–4 across branches of bridges 9 and 10, introducing appropriate fixed phase displacement, e.g. 90°. Capacitive goniometer 12 is made to rotate at an angular velocity of $f_1$ revolutions per second by a motor 15. This motor also drives the tone wheel 16 whose teeth are suitably cut to induce in a coil 17 an A.C. at a frequency F modulated in frequency at frequency $f_1$. This current is applied to modulator 6.

For example, in standard VOR's, the frequencies $F=9960$ cycles and $f_1=30$ cycles have been selected.

The transformation of the VOR equipment into VORDAR substantially consists of adding to the VOR equipment signal:

(a) A circuit arrangement 18 which is driven by a shaft 19 of the VOR equipment rotating at the rate of $f_1$ rotations per second and having an output connected to the input terminal 30, permitting the modulation of the subcarrier wave by a second signal of the appropriate frequency $f_2$ higher than $f_1$, (b) A radio frequency receiver 26 which receives via antenna 27 pulses 114 transmitted by a mobile station, (c) A panoramic display cathode ray tube 24 receiving the said pulses and provided with a particular sweeping device 28 controlled by a frequency $f_1$ signal provided from output terminal 29 of the VOR via discriminator 25 which are reference signals 100 (FIG. 4) and pulses 104 at frequency $f_2$ produced by flip-flop circuit 23.

According to the present invention, arrangement 18 is constituted as follows:

Shaft 19 rotating at the rate of $f_1$ rotations per second drives cogwheel 31 comprising $n$ cogs. Cogwheel 31 is placed directly adjacent a magnetic pick up 32 which provides a frequency signal of $nf_1$ cycles per second. For instance, with a frequency $f_1=30$ c./s., and $n$ equal to 20:

$$nf_1 = 600 \text{ c./s.}$$

The signal provided by the magnetic pick up 32 is amplified by amplifier 33 and the output of amplifier 33 is applied directly on the one hand, and on the other hand through a $$\frac{\pi}{2}$$

phase converter 34 to the two inputs of resolver 35 whereby a rotating field is provided. The armature of resolver 35 being driven into rotation by auxiliary motor 36 provides an output signal, the frequency of which is, according to the direction in which it is driven, the sum or the difference between frequency $nf_1$ of the rotating field and the frequency of the armature rotation rate. For instance, if the motor drives the armature of resolver 35 at the rate of two rotations per second in the opposite direction to that of the rotating field at $nf_1=600$ c./s., the frequency of the output signal will be:

$$f_2 = 602 \text{ c./s.}$$

It will be seen that it is only needed to modify the rotating rate of motor 36 in order to frequency $f_2$, and this allows an additional shift of the modulation frequency $f_2$ for ground VORDAR stations without any modification of their equipment. This frequency shift is utilized in order to permit each VORDAR station to discriminate the responses which are addressed to it in the case where the responders of the mobile stations are tuned to a single frequency, for instance, the frequency reserved for the coded responses to the radar stations.

In this case, on board equipments of the mobile stations are modified according to FIGURE 2 so as to repeat their response signal after a delay equal to a period of the frequency $f_2$ signal of the VORDAR ground station which has initiated their response. In FIGURE 2 there is shown a receiving antenna 51, and receiver 52 connected to three channels:

(a) The reference channel, comprising filter 53 having a central frequency equal to F, followed by a frequency discriminator 54 providing the reference signal at frequency $f_1$;

(b) The azimuth measuring channel comprising a low-pass filter 55 providing the measuring signal at frequency $f_1$ generated by the rotation of the rotating directional pattern;

(c) The distance channel constituted by a band filter 58 of central frequency $f_2$.

The reference channel and the azimuth measuring channel are connected, according to the equipment existing in the aircrafts, either to an automatic azimuth indicator 70 such as represented in FIGURE 2, or to a manual control phase converter 80 such as represented in FIGURE 3. When the on board equipment is connected to an automatic azimuth indicator represented in the dotted line frame 70 of FIGURE 2, the reference signal of frequency $f_1$ provided by the frequency discriminator 54 is applied to phase converter 71 driven by motor 73, then after phase-shifting, to an input of phase discriminator 72 which receives through its second input the azimuth measuring signal of frequency $f_1$ from filter 55. The error signal produced by phase discriminator 72 is applied to motor 73 in a suitable direction to maintain at zero the phase difference between the two signals of frequency $f_1$. The output signal provided by phase converter 71 is thus in phase synchronism with the measuring signal.

FIGURE 3 represents inside of dotted line frame 80 an alternative embodiment which applies to the case in which the equipment on board is not connected to an automatic azimuth indicator. The signal from discriminator 54 is then applied to a phase converter 81 positioned by means of an azimuth manual selector 83 depending upon the azimuth to be followed. The reference signal thus phase shifted is phase compared with the measuring signal provided by filter 55 in phase indicator 82 of the "left-right indicator" type, of which the pilot maintains the pointer at zero by taking the required heading to follow the chosen axis. The phase indicator 82 cuts off the output of phase converter 81 beyond their common connection by means of threshold relay 84 when the aircraft departs from the chosen axis to prevent the response pulse formation.

The output signal of either automatic phase converter 70 or manual control phase converter 80 is stabilized in phase and in phase synchronism with the measuring signal. This signal is applied to pulse generator 57 which, as known, generates pulse 102 of $\tau_1$ during each time the sinusoid representing the measuring signal of frequency $f_1$ passes through zero in a direction, for instance, of increasing values. This pulse is equivalent to the pulse that would be produced at the receiver's output if antenna 51 were scanned by a beam of width $d\theta$ rotating at the same speed as the cardioid pattern, the quantity $d\theta$ being bound up with $\tau_1$ by the equation:

$$d\theta \text{ degrees} = f_1 \times 360 \tau_1$$

$\tau_1$ being expressed in seconds. For example, if $\tau_1$ is made equal to 110 microseconds and $f_1$ is given the value already proposed, the aperture of the equivalent beam will be 1.2°. In the distance channel, band filter 58 is connected to pulse generator 59 analogous to generator 57, which generates pulse 104 of $\tau_2$ duration each time the sinusoid representing the signal of frequency $f_2$ passes through zero in a direction, for instance, of increasing values. In the previously cited U.S. patent application length $\tau_2$ seconds represents a radial distance of $$300,000 \frac{\tau_2}{2}$$

kilometers, or $dp$, which can be selected as may be desired. The shorter the width of the pulse 104, the better is the distance resolution. Pulse generators 57 and 59 are, as known, connected to the two inputs of AND gate 60 which provides pulse 114 of length $\tau_3$ when pulses 102 and 104 are in coincidence. FIG. 4 shows at 100 the sinusoidal reference signal at frequency $f_1$ obtained at the output of frequency discriminator 54, at 101 the signal obtained at the output of filter 55 when the moving object is on a given azimuth $\theta$, at 102 the pulses of length $\tau_1$ taken from signal 101 by pulse generator 57, at 103 the sinusoidal signal at frequency $f_2$ and at 104 the pulses of length $\tau_2$ taken from signal 103 by pulse generator 59.

The points in space that are scanned at a given instant $t$ are those at which there is coincidence of pulses 102 and 104. Pulses 104 define circular crowns 105 (FIG. 5) with a width of $$dp = 300,000 \frac{\tau_2}{2}$$

The place of the points that simultaneously receive the $\tau_1$ and $\tau_2$ pulses are sectors 106 of aperture $d\theta$. In effect, it can be seen that if coincidence exists at a point A of beam 107 in a time $t$, it will then be reproduced at every point of beam 107, the pulses $\tau_1$ and $\tau_2$ (or more accurately, the modulations at frequencies $f_1$ and $f_2$, from which the pulses are formed in the receiver) are propagated at a speed equal to the speed of electromagnetic waves. The angular resolution is $d\theta$; the distance resolution is $dp$.

If $f_2$ is a whole multiple $q$ of $f_1$, for example $$f_1 = 30 \text{ cycles}$$
$$f_2 = 600 \text{ cycles}, \ q = 20$$

the points in space that are scanned are distributed among 20 equally-spaced beams (or rather among 20 equally-spaced sectors of aperture $d\theta$, that is, spaced $$\frac{360}{20} = 18°$$

These beams or sectors will be designated (see FIG. 5) by the notation $R_{m/n}$, where $m$ indicates that the beam is generated in the course of the $m$th rotation of the cardioid.

$n$ indicates the rank of the beam ($n$ comprised between 1 and $q$, and in the example between 1 and 20).

FIG. 6 shows the 20 beams $R_{1/1}$ to $R_{1/20}$ generated during the cardioid's first rotation. During the cardioid's next rotation it is clear that beams $R_{2/1}$ to $R_{2/20}$ will be applied respectively to their homologous beams $R_{1/1}$ to $R_{1/20}$.

Since it is desirable to explore all points in space, it would be advisable, in the hypothesis under consideration, to adopt a large value for $d\theta$ ($d\theta \geq 18°$) but this would deprive the system of any practical interest. In order to explore all points in space and still maintain a suitable separating power, $f_2$ is given a value slightly different from a harmonic of $f_1$, that is, in this case a value slightly different from the harmonic 20. Assuming that $$f_2 = (20 + \epsilon) 30$$

whence $k = q + \epsilon$, it is found (FIG. 6) that beam $R_{2/n}$ is no longer applied to its homologous beam $R_{1/n}$ of the preceding revolution. Actually, the angle between two consecutive beams of the same revolution is $$\frac{2\pi}{20 + \epsilon}$$

The beams $R_{2/n}$ and $R_{1/n}$ are shifted with respect to each other by an angle $$\omega = 2\pi - 20 \times \frac{2\pi}{20+\epsilon} = 2\pi \frac{\epsilon}{20+\epsilon}$$

The result is that beam $R_{2/n}$ is shifted on beam $R_{1/n}$ by $\omega$, beam $R_{3/n}$ is shifted on beam $R_{1/n}$ by $2\omega$, etc., and beam $R_{p/n}$ will be applied to beam $R_{1/n-1}$ if $$p\omega = \frac{2\pi}{20+\epsilon}$$

or $$2\pi \frac{\epsilon}{20+\epsilon} \times p = \frac{2\pi}{20+\epsilon}$$

or $$p\epsilon = 1$$

Thus, at the end of $p$ revolutions, $20p$ regularly spaced beams will have been scanned and no longer 20 beams as in the case where $f_2 = 20 f_1$. Each beam is no longer scanned every $$\frac{1}{f_1}$$

second but every $$\frac{p}{f_1}$$

second.

The number $p$ can be chosen at will. However, it is so chosen that it will lead to whole values for $f_2$. Assuming that $$p = 15$$

then $$f_2 = 602 \text{ cycles} \left(\epsilon = \frac{1}{p} = \frac{1}{15}\right)$$

The spacing between two beams $R_{m/n}$ and $R_{m+1/n}$ is $\omega = 1.2°$.

The complete scanning cycle of the plan takes $15/30 = 0.5$ second.

All points of the plan will be effectively scanned if a separating power of $d\theta \geq \omega$ is chosen. Actually, overlapping of adjacent sectors is provided by making $d\theta$ substantially greater than $\omega$ (FIG. 6).

Due to the high rotating speed of beam 107, precautions must be taken to prevent distortion of the plan position resulting from the fact that the beam has turned through an appreciable angle between the moment the pulses of close moving objects and the pulses of far moving objects arrive, for a predetermined azimuth.

In order to prevent such distortion, scanning must be stopped 602 times a second, or, more generally, every $$\frac{1}{f_2}$$

second, at the position it had the moment sinusoid 103 passes through zero through positive values.

The radial deflection signals are sawteeth taken from the pulses 104 produced by flip-flop circuit 23.

As for angular deflection, instead of applying signal 100, produced by discriminator 25, to the corresponding deflection device of cathode-ray tube 24, this signal is converted into a more complex signal 108 (FIG. 7), obtained by creating steps 109 on signal 100, broken off at the rate of the pulses 104 obtained from flip-flop circuit 23.

A difference with the aforementioned United States patent application is that the connection of generator 57 to gate 60 is effected by means of OR gate 67 the second input of which is connected to the output of flip-flop 68, the control input of which is connected to the output of gate 60. When the coincidence between pulses 102 and 104 generates a pulse 114, flip-flop 68 previously in a stable reset condition switches to an unstable set condition for a period of time comprised between the upper limit and twice the lower limit between which the periods $$\frac{1}{f_2}$$

of VORDAR additional modulation are adjusted.

It will be seen that in order that this condition be fulfilled, it is sufficient that frequencies $f_2$ of the various VORDAR stations differ from one another by less than one octave. When flip-flop 68 is in a set condition it provides a signal which holds open AND gate 60. Another pulse 104 consecutive to pulse 104 which was in coincidence with pulse 102 thus generates a further pulse 114, but this latter is ineffective on flip-flop 68 which is in a set condition. The following pulse 104 after the second pulse 104 which coincided with pulse 102 arriving only after the resetting of flip-flop 68 and the closing of gate 60 does not give rise to any signal. There is thus for each coincidence of pulses 102 and 104 two successive pulses 114 spaced by a period $$\frac{1}{f_2}$$

from the VORDAR ground station the mobile station of which receives signals. These pulses applied to transmitter 61 initiate on antenna 62 the transmission of two identical response signals shaped by coder 63.

Only a few VORDAR stations can simultaneously be in line of sight of one aircraft, and therefore the carrier shift between their frequencies $f_2$ may be sufficient in order that the conventional correlation systems may easily permit each VORDAR station to discriminate among the signals which are received on the response frequency of the mobile stations, those which are repeated with a time interval equal to a period $$\frac{1}{f_2}$$

of their proper additional modulation. Under these conditions, it is the second response signal which is utilized. There occurs then on the panoramic display of the cathode ray tube 24 (FIGURE 1) of the VORDAR system, a rotation of the display of an angle $$2\pi \frac{f_2}{f_1}$$

which is corrected by an appropriate phase difference of the reference signal of frequency $f_1$ between phase discriminator 25 and sweeping device 28 (FIGURE 1).

While the principles of the invention have been described above in connection with a specific embodiment, it is to be clearly understood that this description is made only by way of example and not as a limitation on the scope of the invention.

What is claimed is:

1. An omni-range beacon system for interrogating a craft and determining the location of said craft and transmitting rotating direction indicating signals in a radiation pattern from which azimuth indications of said craft can be produced in a beacon station comprising at the beacon station a generator for producing continuous wave further signals, the frequency of which is a harmonic of said direction indicating signals plus additional cycles, said frequency being identified with said beacon, means for transmitting said further signals substantially omni-directionally from said beacon, an indicating device at said beacon synchronized with said further signals, means on said craft for receiving and detecting said direction indicating signals and said further signals at the time said radiation pattern is aligned in a predetermined pattern with respect to said craft, means for generating a pair of signals from said further signals and said direction indicating signals having a spacing therebetween equal in time to the reciprocal of the frequency of said further signals, means to transmit said pair of signals and means at said beacon to receive said pair of signals and means responsive to said pair of signals from said craft and to said further signals for producing on said indication device an indication of the distance and azimuth of said interrogated craft relative to said beacon.

2. An omni-range beacon system for interrogating a craft and determining the location of said craft and having means for transmitting a rotative directive radiation pattern to provide a variable envelope signal wave of a predetermined frequency and means for transmitting continuous wave reference signals of said predetermined frequency having an origin corresponding to a particular reference direction of said directive pattern so that azimuth indications of said interrogated craft can be produced in a beacon station comprising at said beacon station a generator for producing continuous wave further signals the frequency of which is a harmonic of said reference signal plus additional cycles, said frequency being identified with said beacon, means for transmitting said further signals substantially omni-directional from said beacon, an indicating device at said beacon synchronized with said further signals, and on said craft means for receiving and detecting said reference signals and said further signals transmitted from said beacon when said directive radiation pattern is aligned with said craft, means for deriving said envelope signal wave, means for generating twin pulses from said further signal and said envelope signal wave having a spacing therebetween equal in time to the reciprocal of the frequency of said further signal, means for transmitting said twin pulses and means at said beacon to receive said twin pulses and means responsive to said further signals and to said twin pulse signals to produce an indication on said indicating device of the distance and azimuth of said craft relative to said beacon.

3. An omni-range beacon system according to claim 2 further comprising on said craft means for separating said variable envelope signal, said reference signals, and said further signals, means for producing gating pulses in response to a predetermined amplitude condition of said variable envelope signal wave, means for deriving pulses from said further signals corresponding to each signal thereof, an OR gate for applying said gating pulse to an AND gate, means applying the output of said pulse deriving means to said AND gate, a bistable circuit coupling the circuit of said AND gate to said OR gate, the output of said AND gate being said twin pulses having a spacing therebetween equal in time to the reciprocal of the frequency of said further signals, a transmitter, and means coupling the output of said AND gate to said transmitter.

4. An omnirange beacon system for interrogating a craft and determining the location of the craft relative to the beacon station and including means for transmitting a rotating directive radiation pattern and means for transmitting continuous wave reference signals of the same frequency as the envelope frequency derived from the rotation of said pattern so that azimuth indications can be produced in said beacon station, comprising at said beacon a generator for producing further signals the frequency of which is a harmonic of said reference signals plus additional signals, said frequency being identified with said beacon station, means for transmitting said further signals substantially omni-directionally from said beacon, an oscilloscope indicating device, means responsive to said reference frequency to produce a rotary deflection of the beam of said device, means responsive to the output of said generator to produce a radial deflection of said beam, and means on said craft for receiving said transmitting signals and to detect said reference signals, further signals and the envelope frequency, means for generating twin pulses from said envelope frequency and said further signals at the time said directive radiation pattern is aligned in a predetermined phase relation with respect to said craft, said twin pulses having a spacing therebetween equal in time to the reciprocal of the frequency of said further signals, means at said beacon to receive and detect said twin pulse signals and means at said beacon responsive to said twin pulses to produce on said indicating device a brightness variation of said beam to provide an indication of the distance and angular position of said craft with respect to said beacon.

References Cited by the Examiner
UNITED STATES PATENTS
2,666,198   1/54   Wallace _____ 343—11

CHESTER L. JUSTUS, *Primary Examiner.*
MALCOLM A. MORRISON, *Examiner.*